Patented Nov. 27, 1928.

1,693,066

UNITED STATES PATENT OFFICE.

ALFRED H. WHITE, OF ANN ARBOR, MICHIGAN.

PROCESS FOR PURIFYING THE WATER USED FOR STEAM-BOILER PURPOSES.

No Drawing.   Application filed December 7, 1925.   Serial No. 73,901.

This invention relates to an improved process for purifying the water used for steam boiler purposes, and has for its object the neutralization of the objectionable alkaline content, whether the same be natural or a resultant of its previous subjection to some such softening process as the now well-known zeolite process or the lime and soda process, either of which leaves in the water ions of Na, Ca, Mg, $CO_3$ and $SO_4$, which, as the water is evaporated, results in the formation of scale on the boiler surface, partly through deposition of the salts previously in solution, and partly because of further reaction within the boiler. Hydrolysis releases $CO_2$, which passes off with the steam, thus increasing the alkalinity of the water. The hydrolytic reactions may be set out as follows:

$$CaCO_3 + H_2O = Ca(OH)_2 + CO_2.$$
$$MgCO_3 + H_2O = Mg(OH)_2 + CO_2.$$
$$Na_2CO_3 + H_2O = 2NaOH + CO_2.$$

Sulphuric acid and hydrochloric acid have heretofore been used as neutralizating media for the excess alkalinity, but not with entire satisfaction because of the resultant formation of a soluble salt of iron, which results in dangerous corrosion of the boiler wall, if even a slightly excessive quantity of acid is used. Moreover, the chlorides of calcium, magnesium and iron, and, to a lesser degree, the sulphates and other soluble salts of these rather weak bases, hydrolize, thus releasing a metal-attacking free acid.

In place of sulphuric acid, I make use of phosphoric acid, which yields an insoluble salt of iron, as well as of calcium and magnesium, thus tending to form a protective phosphate coating on the boiler wall, instead of corroding it. The proportion of phosphoric acid to be added must, of course, depend on the strength and character of the alkaline content in the water. If only carbonates of calcium and magnesium are present, free phosphoric acid or an acid phosphates of lime may be used. If sulphates of lime or magnesium alone are present, sodium phosphate may be used. If the water is already alkaline with sodium carbonate, phosphoric acid alone may be used. The following equations will serve to illustrate typical reactions:

$$3Ca(HCO_3)_2 + 2H_3PO_4 = Ca_3(PO_4)_2 + 6CO_2 + 6H_2O.$$
$$3CaSO_4 + 2Na_3PO_4 = Ca_3(PO_4)_2 + 3Na_2SO_4.$$
$$Na_2CO_3 + H_3PO_4 = Na_2HPO_4 + CO_2 + H_2O.$$

Phosphates of calcium and magnesium both hydrolize to form basic salts, and in so far as sodium salt may not be represented by the formula $Na_2HPO_4$ the above equations cannot be considered as giving all of the possible reactions. If relatively large proportions of sodium carbonate or bicarbonate are present, as is the case in some waters after softening by the zeolite process, a considerable proportion of this carbonate may be neutralized by a cheaper acid, such as sulphuric, without ill effects. It is much safer to add this sulphuric acid in the presence of a phosphate, for if even a slight excess of sulphuric acid is added, it partially displaces the weaker phosphoric acid from phosphate of lime, setting free phosphoric acid, which in feeble concentration does not corrode steel and forms an insoluble phosphate.

The chemical to be added should either be free phosphoric acid and sodium phosphates or sulphuric acid and phosphoric acid. In either case sufficient phosphate ions should be added to convert the calcium and magnesium to insoluble phosphates, which in their final form may be regarded as basic phosphates. Sufficient acid should be added to liberate the carbon dioxide and combine with the sodium previously present as carbonates to form a salt which is nearly neutral in reaction. After the carbon dioxide has been removed by boiling and the reaction is complete, the water will contain insoluble phosphates of calcium and magnesium in suspension and salts of sodium in solution, with a slight amount of acidity or alkalinity.

Expressed in terms of ions, there should be added sufficient phosphate ions to combine with the calcium and magnesium ions present to form insoluble phosphates, and sufficient hydrogen ions to react with the carbonate ions and liberate carbon dioxide. If this hydrogen ion requirement is less than that corresponding to the phosphate ion requirement, the remainder of the phosphate ion should be coupled with sodium or some other metallic ion. If the hydrogen ion requirement is higher than that corresponding to the phosphate ion requirement, the balance of the hydrogen ion may be coupled with the additional phosphate ion or some other ion such as sulphate. The insoluble phosphate may be separated from the solution or left in suspension.

Instead of using free phosphoric acid and normal sodium phosphates, it may be more economical to use an acid phosphate, and I desire the scope of this disclosure to be understood as including the various possible combinations of acids and bases which may be most economical or convenient in each particular case.

If the water to be treated has only a small amount of scale-forming elements the chemicals may be added directly to the raw water as it enters the boiler or into the boiler itself. Carbon dioxide will be driven off with the steam and the final products will be basic phosphates of calcium and magnesium. If the water contains a larger amount of scale-forming elements, it may probably be more economical to give it a preliminary treatment with lime and soda ash or with a zeolite and then add to this treated water, phosphoric acid, or both phosphoric and sulphuric acid, as indicated above. By this process, the excess alkalinity in the water will be corrected and the lime and magnesium precipitated as phosphates.

It will not always be necessary to use the full amount of chemicals shown by the equation to obtain a result which is satisfactory for practical purposes, and it is manifestly uneconomical to use more chemicals than necessary to obtain a commercially satisfactory result. I desire to have it understood, therefore, that I claim the use of a lesser amount of the chemicals and consequent incomplete purification where such lesser amount will give us a satisfactory result. The order in which the chemicals are added is not important from the theoretical standpoint, but from the practical standpoint, it may frequently be desirable to add the free acid first and then sodium as may be needed.

What I claim is:

1. The process of purifying water which consists in contemporaneously adding thereto phosphoric acid, sufficient to form insoluble phosphates with the calcium, magnesium and iron carbonates in solution, and sufficient sodium phosphate to form insoluble phosphates with the other calcium, magnesium, and iron salts in solution, the relative quantities of phosphoric acid and the sodium phosphate used being such as to effect substantial neutralization of the water after the carbon dioxide has been removed from the solution.

2. The process of treating a water to effect the elimination of potential scale-forming characteristics, consisting in adding thereto such proportion of phosphoric acid relatively to the initially contained alkaline elements that the formation of insoluble phosphates results from its association with the calcium, magnesium, and iron carbonates present therein, thereby substantially displacing the contained carbon dioxide.

3. The process of limiting the development of alkalinity in boiler water during evaporation, which consists in adding sufficient phosphoric acid to decompose the combined carbon dioxide content of the hydrolizable carbonates and leave the water substantially neutral after boiling, and simultaneously therewith effecting the precipitation of insoluble phosphates of lime, magnesium and other bases capable of forming such insoluble compounds.

4. The process of purifying water which has been previously treated by the lime-soda or zeolite process, which consists in adding to the then present ingredients such combinative proportion of phosphoric acid as will effect the formation of insoluble phosphates, and thereafter heating the same to develop the initially latent insoluble salts.

5. The process of purifying a water already treated by the lime-soda or zeolite process, which consists in effecting the formation of soluble phosphates of sodium and insoluble phosphates of calcium and magnesium by the addition of phosphoric acid, thereby contemporaneously displacing the major portion of the contained carbon dioxide, and thereafter effecting the expulsion of the residual carbon dioxide by heating.

In testimony whereof, I sign this specification.

ALFRED H. WHITE.